Patented July 21, 1936

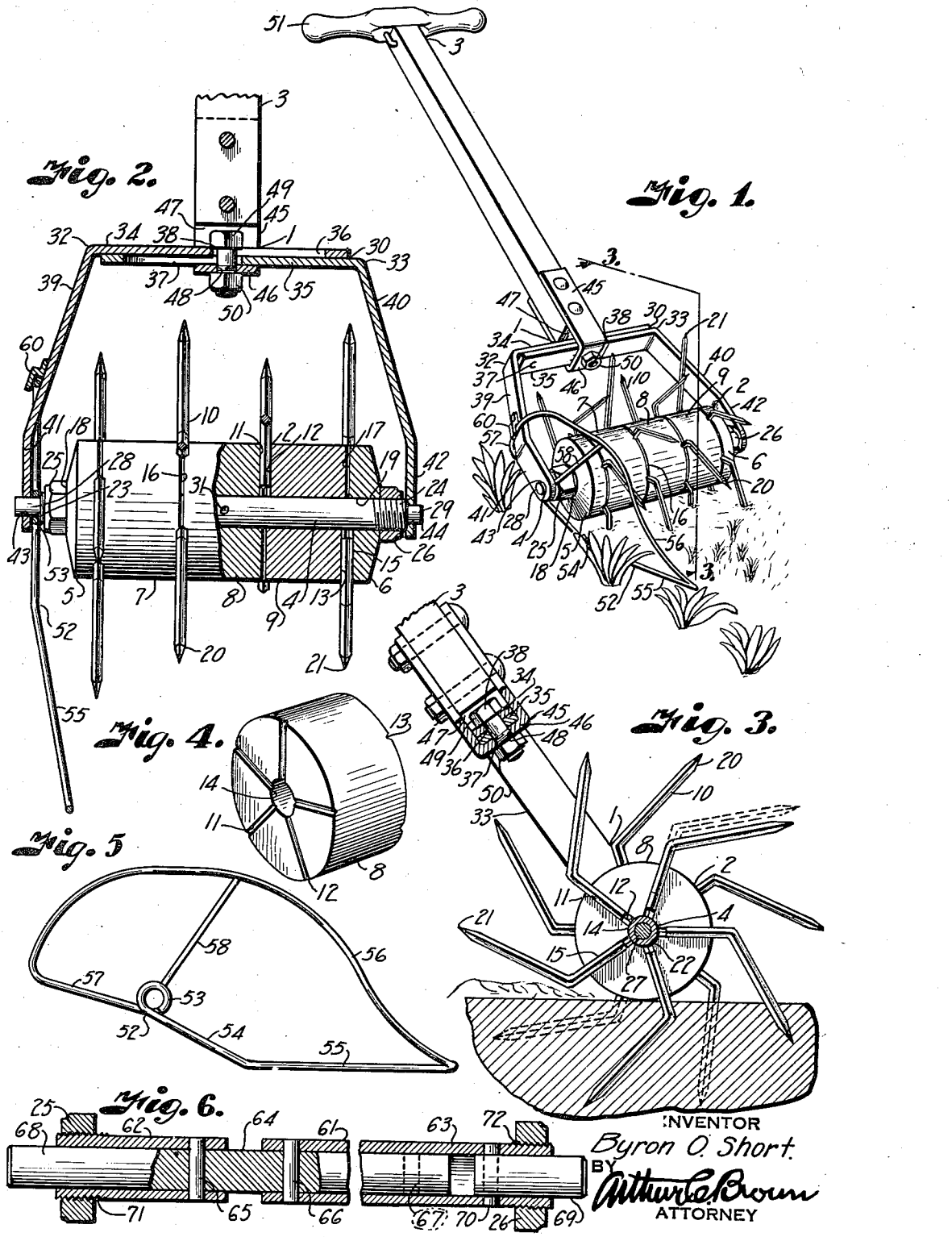

2,048,201

UNITED STATES PATENT OFFICE 2,048,201

GARDEN CULTIVATOR

Byron O. Short, Pierce City, Mo.

Application April 4, 1935, Serial No. 14,622

5 Claims. (Cl. 97—52)

This invention relates to cultivators, particularly to those adapted for use in cultivating and weeding small garden plots and has for its principal object to provide a simple inexpensive cultivator construction that is easily operated by hand power.

Other important objects of the invention are to provide a cultivator adapted for thorough cultivation and mulching of the soil without danger of injuring the roots of the plants, to provide a cultivator having adjustable features to adapt it for different spaced rows and cultivation depths, and to provide the cultivator with a guard for protecting the foliage.

In accomplishing these and other objects of the invention, I have provided improved details of structure, the preferred forms of which are illustrated in the accompanying drawing, wherein:

Fig. 1 is a perspective view of a garden cultivator embodying the features of the present invention.

Fig. 2 is a plan view of the cultivator, parts of which are in section to better illustrate the construction.

Fig. 3 is a horizontal section through the cultivator on the line 3—3, Fig. 1.

Fig. 4 is a detail perspective view of one of the intermediate cylinder sections.

Fig. 5 is a side elevational view of the guard as it appears when detached from the cultivator.

Fig. 6 is a longitudinal section through a modified form of cylinder shaft.

Referring more in detail to the drawing:

1 designates a cultivator constructed in accordance with the present invention and shown as including a spiked cylinder 2 pushingly propelled by means of a handle bar 3 that is connected with the axle shaft 4 of the cylinder.

The cylinder includes end sections 5 and 6 which cooperate with intermediate sections 7, 8 and 9 that are arranged in abutting axial alignment to clamp therebetween a plurality of spikes 10. The respective ends of the intermediate sections are provided with a plurality of radially extending grooves 11 arranged in such a manner that the grooves 12 on one end are in staggered relation with the grooves 13 at the other end. The grooves 12 and 13 extend from an axial opening 14 in the sections to the outer peripheries thereof to adjustably mount the shank ends 15 of the spikes 10. In order to enhance the clamping action of the sections on the shanks of the spikes, the grooves are preferably formed V-shaped in cross section and are of shallower depth than half the thickness of the shanks to allow sufficient space 16 between the sections to permit the sections to be drawn tightly together. The end sections 5 and 6 have inner faces 17 cooperating with the corresponding end faces of the outer sections 7 and 9 to clamp outer sets of spikes 10. The outer faces of the end sections are substantially coned in the direction of the axis thereof and terminate in flat nut engaging faces 18 concentric with openings 19 that align with the openings 14.

The spikes 10, while they may be of various cross-sectional shapes, are preferably quadrangular so that they will not turn in the grooves. The outer ends 20 of the spikes are bent angularly from the shank portions in the forward rotational direction of the cylinder, and are located in planes extending substantially tangential to the periphery of the cylinder sections, as best shown in Fig. 3. The terminal ends of the spikes may be pointed as at 21 or otherwise sharpened to permit their ready entrance into the soil.

The shaft 4 includes a hollow tube 22 extending through the axial bores 14 and 19 of the sections and has threaded ends 23 and 24 projecting beyond the nut engaging faces 18 of the end sections to mount clamping nuts 25 and 26 whereby the sections are drawn together in clamping engagement with the shanks of the spikes and to retain the cylinder sections in assembled condition. The shaft 4 further includes a rod 27 extending through the axis of the tube 22 and has projecting ends 28 and 29 to form trunnions for mounting the yoke 30 of the handle bar 3.

The rod 27 is snugly mounted within the tube 22 and is preferably spot welded thereto through an opening 31 formed substantially midway the length of the tube, as shown in Fig. 2, to prevent its movement therein.

The yoke 30 includes strap-like sections 32 and 33 having overlapping cross arms 34 and 35 provided with aligning slots 36 and 37, through which a fastening device, such as a bolt 38, is extended in securing the handle bar to the yoke as later described. The outer ends of the overlapping portions of the yoke converge outwardly at obtuse angles therewith to provide side arm portions 39 and 40 terminating in parallel bearing portions 41 and 42, which have openings 43 and 44 to engage over the projecting ends of the rod 38.

The lower end of the handle bar 3 has a U-shaped clip 45 belted thereto so that a bar portion 46 thereof is spaced from the end of the bar to form an opening 47, through which the overlapping arm portions are extended, as best illustrated in Figs. 1, 2 and 3. The bar portion of the clip is provided with an opening 48 to pass the threaded shank of the bolt 38 which is positioned so that its head is mounted in the recess 47 in engagement with the outer arm 34 of the yoke. Mounted on the shank end of the bolt and cooperating with the head 49 to secure the sections of the yoke together and the handle thereto is a nut 50. The opposite end of the handle bar carries a T-shaped handle 51 by which the cultivator is readily manipulated by the hands of the operator.

In order to prevent the set of spikes on the row side of the cylinder from damaging the foliage of the plants, that end of the shaft carries a guard 52 preferably formed of wire bent to provide an eye 53 for engaging over the projecting end of the shaft at a point between the nut 25 and arm 32 of the yoke, a forwardly and downwardly inclined portion 54 terminating in a runner 55 that rides along the surface of the soil in parallel relation to the rows of plants under cultivation, and a retractively bent, reverse curve portion 56 extending toward the rear of the cultivator where it bends downwardly to connect with the eye 53 by an inclined bar portion 57 that extends in substantially parallel relation with the inclined bar portion 54 previously described. To brace the reversely curved portions of the guard, a brace 58 is preferably connected with the eye and with the reverse curve portion 56.

In assembling a device of the type shown in Figs. 1 to 5, inclusive, the sections of the cylinder are threaded upon the tube 22 of the shaft, and the sets of spikes 10 are inserted in the respective aligning grooves 12, the shanks being adjusted therein so as to provide the proper protrusion to give the desired depth of cultivation, as shown by the dotted lines in Fig. 3.

The nuts 25 and 26 are then applied to the threaded ends of the tube and clamped against the seating portions 18 of the end sections 5 and 6. When the sections are thus clamped together, the spikes are fixed in their adjusted position and all of the sections rotate as a unit so that the spikes retain their same lateral alignment as the device is propelled along a row of plants under cultivation.

The guard 52 is then applied to the projecting end of the rod 27 and the arcuate rear portion thereof is guidingly retained under an angle shaped clip 60 that is fixed to the side arm of the yoke. The nut 50 of the yoke is then loosened and the side arms of the sections 32—33 are spaced apart a sufficient distance to permit passage of the apertured arms over the ends of the rod. The yoke sections are then moved together and held in position upon tightening of the nut 50. The device is then assembled and ready for use.

In using the cultivator it is pushed along the ground by the gardener so that the sharpened ends of the spikes successively penetrate the soil in substantially perpendicular position, as best illustrated in Fig. 3. On continued rolling movement of the cylinder the respective spikes progressively swing through the soil into substantially parallel relation with the surface at the time they are withdrawn therefrom. This change in directional movement of the spikes causes an upward prying and loosening action in the soil and also provides a lever action to facilitate penetration of the spikes which are successively moving into position for engaging the ground.

By shaping the spikes as above outlined and shown, the forward rolling movement of the cultivator not only effects easy penetration of the spikes, but also tends to draw the machine along the ground and reduces the power required by the operator in propelling the device.

The spikes are so arranged in staggered relation that the number of spikes on the respective ends of the cylinder are substantially equal so that there is no lateral drift caused thereby that may tend to move the machine off of its desired path of travel. If desired the spikes 10 may be removed and the cylinders retightened so that the device may be used as a roller.

In some instances it may be desirable to change the width of the cylinder and this is accomplished by removing or inserting one or more of the intermediate cylinder sections. In this instance a shaft 61 is provided in place of the shaft above described, the shaft being adjustable as to length to accommodate the greater or lesser number of cylinder sections.

This shaft is illustrated in Fig. 6 and is shown as including spaced tubular sections 62 and 63 connected by a rod 64. The tubular section 62 is permanently connected with the rod by a pin 65 extending through aligning openings in the rod and tubular section while the opposite end of the rod is adjustably telescoped within the tubular section 63 and retained in adjusted position by a removable pin 66 that is extended through aligning openings in the tube 63 and through any one of a series of openings 67 formed in that end of the rod.

The opposite end of the rod projects from the end of the tubular section 62 to provide a trunnion 68 for the arm 41 of the yoke while the trunnion for the other arm 42 of the yoke is formed by a stud 69 inserted in the outer end of the tubing section 63 and retained by a tight pin 70 similar to the pin 60 previously described.

In using the adjustable axle, the pin 66 is removed and the tubing section 63 is adjusted on the rod 64 until the outer threaded ends 71 and 72 of the respective tubes are in such spaced relation that they will project from the ends of the assembled cylinder to accommodate the clamping nuts 25 and 26. The removable pin is then inserted in the aligning opening 66 to secure the shaft in adjusted position.

The assembled cylinder sections are then sleeved on the shaft and retained by the clamping nuts, after which the unit may be mounted within the arms of the yoke in the same manner as above described.

From the foregoing it is apparent that I have provided a cultivator which is of simple and inexpensive construction, and which is well adapted to the cultivation and mulching of small garden plots.

What I claim and desire to secure by Letters Patent is:

1. A garden cultivator including a plurality of cylindrical sections, a shaft for mounting said sections, means for adjusting the length of the shaft to conform to the length of said sections, a handle bar, a yoke having arms for mounting ends of the shaft, and means adjustably spacing said arms to conform to the length of said shaft including means for securing the yoke to the handle bar.

2. A garden cultivator including a shaft, a plurality of cylinder sections mounted on the shaft and having radial grooves in the ends thereof, spikes having shanks adjustably mounted in said grooves, nuts threaded on the ends of said shaft for clamping the sections together to retain the spikes, a rod fixed in and having trunnion members projecting from opposite ends of the shaft, yoke members having outer end portions loosely mounted on the ends of the rod, a handle member, and means adjustably attaching the inner ends of the yoke members to the handle member to adjust width of the yoke to accommodate length of the cylinder.

3. A garden cultivator including a plurality of cylindrical sections, a shaft for mounting said sections including tubular members, means adjustably connecting the tubular members, a handle bar, a yoke having arms for mounting the shaft, and means adjustably spacing said arms to conform to the length of said shaft including means for securing the yoke to the handle bar.

4. A garden cultivator including a shaft, a plurality of cylinder sections mounted on the shaft and having radial grooves in the ends thereof, spikes having shanks adjustably mounted in said grooves, nuts threaded on the ends of said shaft for clamping the sections together to retain the spikes, a rod fixed in said shaft having ends projecting therefrom, yoke members having outer end portions loosely mounted on the ends of the rod, a handle member, means adjustably attaching the inner ends of the yoke members to the handle member to permit adjustment in width of the yoke corresponding to adjustment of length of the cylinder, and a guard mounted on one end of the shaft between the adjacent yoke member and the adjacent nut for projecting foliage on the row side of the cultivator.

5. A cultivator including a shaft, a sectional cylinder on the shaft, trunnion members mounted on the ends of the shaft, a divided yoke having end portions mounted on the trunnion members, and a handle attached to and connecting opposite end portions of the yoke to permit adjustment in width of the yoke corresponding to adjustment of length of the cylinder.

BYRON O. SHORT.